United States Patent
Walker

(10) Patent No.: US 8,083,936 B1
(45) Date of Patent: Dec. 27, 2011

(54) REDUCING WASTE WATER IN REVERSE OSMOSIS RESIDENTIAL DRINKING WATER SYSTEMS

(76) Inventor: Robert Walker, Colrain, MA (US)

( * ) Notice: Subject to any disclaimer, the term of this patent is extended or adjusted under 35 U.S.C. 154(b) by 206 days.

(21) Appl. No.: 12/379,873

(22) Filed: Mar. 3, 2009

Related U.S. Application Data

(60) Provisional application No. 61/067,636, filed on Mar. 3, 2008.

(51) Int. Cl.
*B01D 35/14* (2006.01)
(52) U.S. Cl. ........ 210/109; 96/4; 210/257.1; 210/321.6; 210/321.65; 210/418; 251/63; 251/121; 251/122
(58) Field of Classification Search ............. 137/505.13, 137/535, 537, 538, 540; 210/97, 109, 257.2, 210/321.6, 321.65, 321.66, 418, 652, 195.2; 96/4; 251/63, 63.5, 121, 122, 321, 324, 325; 417/545, 547, 549, 552
See application file for complete search history.

(56) References Cited

U.S. PATENT DOCUMENTS

| | | | | |
|---|---|---|---|---|
| 1,343,694 A | * | 6/1920 | Turner | 303/62 |
| 2,195,244 A | * | 3/1940 | Ericson | 60/585 |
| 3,077,989 A | * | 2/1963 | Larkin | 210/98 |
| 3,315,696 A | * | 4/1967 | Hunter | 137/244 |
| 3,493,496 A | | 2/1970 | Bray et al. | 210/116 |
| 3,568,843 A | | 3/1971 | Brown | 210/321.65 |
| 3,616,921 A | | 11/1971 | Bray | 210/195.2 |
| 3,939,074 A | | 2/1976 | Bray | 210/257.2 |
| 3,959,146 A | | 5/1976 | Bray | 210/257.2 |
| 3,966,616 A | | 6/1976 | Bray | 210/450 |
| 4,021,351 A | | 5/1977 | Bray | 210/232 |
| 4,108,134 A | * | 8/1978 | Malec | 123/196 R |
| 4,156,645 A | | 5/1979 | Bray | 210/652 |
| 4,190,537 A | | 2/1980 | Tondreau et al. | 210/98 |

(Continued)

OTHER PUBLICATIONS

Robert Slovak, Water on-Water RO,The Long Awaited Next Step, Water Conditioning & Purification, Jul. 2006, pp. 38 to 43.
Howstuffworks, How does reverse osmosis work?, 2 pages, science, howstuffworks.com/reverse-osmosis, Jul. 1, 2008.
Nimbus water systems, 1 page, nimbuswater.com/aboutnimbus/index, Sep. 23, 2008.
AMTA, pp. 1 to 3, amtaorg.com/about_awards, Sep. 23, 2008.
Home Water Treatment Systems, Reverse Osmosis Filtration, p. 7, engr.uga.edu/service/extension/publications/c819-10c, Jul. 10, 2008.
Reverse osmosis, pp. 1 to 5, en.wikipedia.org/wiki/Reverse_osmosis, Jul. 1, 2008.

*Primary Examiner* — Joseph Drodge

(57) ABSTRACT

The production of purified water from a residential reverse osmosis drinking water system is limited by the pressure build up in the holding tank or reservoir. While the pressure in the tank increases the brine or waste water continues to flow at a constant rate. This condition makes an undesirable out of proportion relationship between the purified water and the waste water. The production of product water is controlled by the differential pressure across the purification membrane, as the tank pressure increases the differential pressure decreases and reduced production of product water results. The purpose of the device is to utilize the increasing tank pressure as a force to actuate the valve that proportions the waste water in a direct relationship with the product water. The ratio between the product water and the waste water remains constant during the period that purified water is being delivered to the holding tank.

5 Claims, 8 Drawing Sheets

U.S. PATENT DOCUMENTS

| | | | |
|---|---|---|---|
| 4,230,579 A | 10/1980 | Bray et al. | 210/101 |
| 4,548,714 A | 10/1985 | Kirwan et al. | 210/232 |
| 4,623,451 A | 11/1986 | Oliver | 210/87 |
| 4,711,723 A | 12/1987 | Bray | 210/652 |
| 4,713,175 A | 12/1987 | Bray | 210/259 |
| 4,756,835 A | 7/1988 | Wilson | 210/651 |
| 4,784,771 A | 11/1988 | Wathen et al. | 210/636 |
| 4,828,708 A | 5/1989 | Bray | 210/654 |
| 4,842,724 A | 6/1989 | Bray et al. | 210/104 |
| 4,842,736 A | 6/1989 | Bray et al. | 210/321.6 |
| 4,885,081 A | 12/1989 | Oliver | 210/87 |
| 4,906,372 A | 3/1990 | Hopkins | 210/321.7 |
| 5,096,574 A * | 3/1992 | Birdsong et al. | 210/90 |
| 5,296,148 A | 3/1994 | Colangelo et al. | 210/642 |
| 5,778,679 A | 7/1998 | Celorier et al. | 62/47.1 |
| 6,190,558 B1 | 2/2001 | Robbins | 210/634 |
| 6,802,487 B2 * | 10/2004 | Heun et al. | 251/122 |
| 2005/0063846 A1 * | 3/2005 | Maeda | 417/471 |
| 2008/0031754 A1 * | 2/2008 | Harada et al. | 417/549 |

* cited by examiner

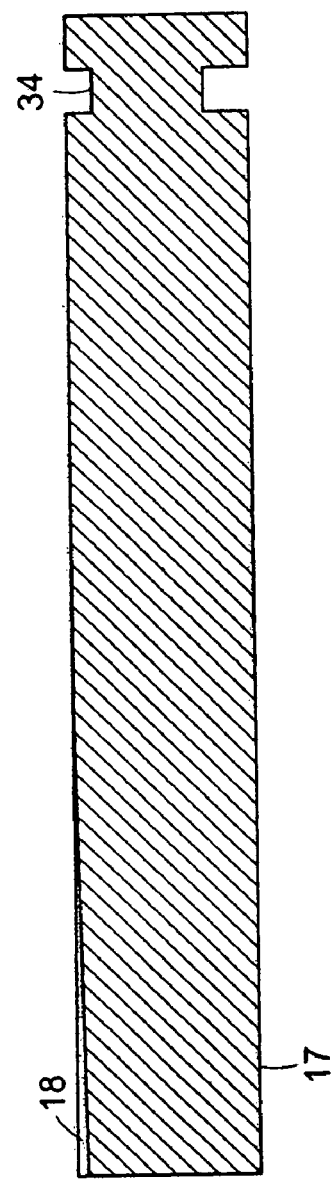
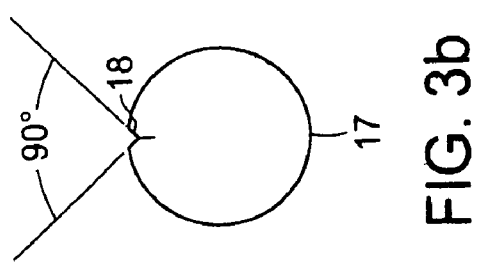

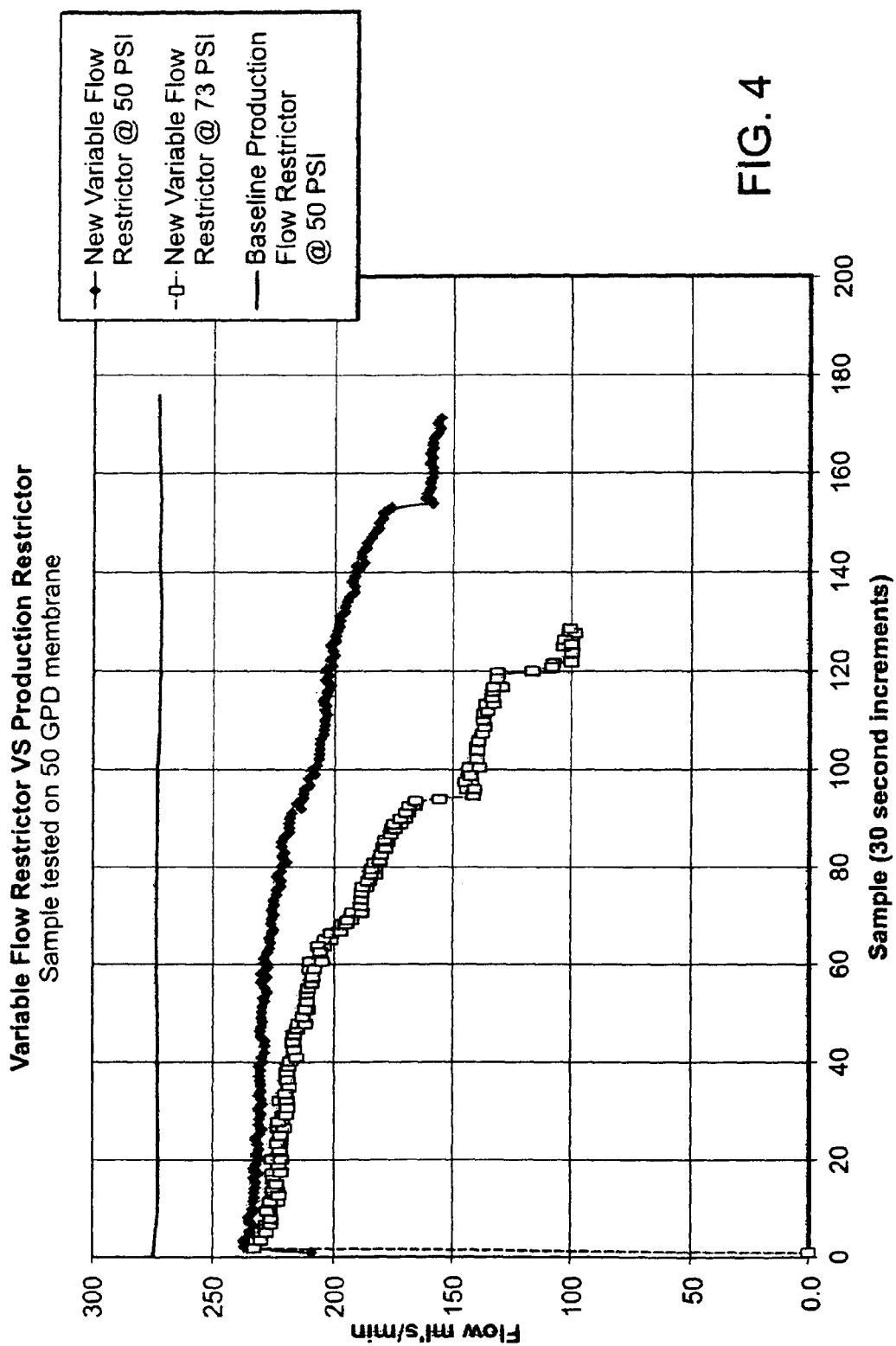

Vee Groove        Semi Circle        Square        Flat

Taper          Multi Flat

REDUCING WASTE WATER IN REVERSE OSMOSIS RESIDENTIAL DRINKING WATER SYSTEMS

This utility patent application has priority benefit of U.S. provisional application No. 61/067,636, filed on Mar. 3, 2008.

BACKGROUND OF THE INVENTION

1. Field of the Invention

This invention relates to reverse osmosis residential/commercial/business drinking water systems and other water systems.

2. Background of the Invention

The total dissolved solids in residential drinking water can be drastically reduced by the process of reverse osmosis (RO). This is accomplished by forcing water from a normal source, a municipal delivery system or a well, through a membrane. The liquid that passes through the membrane is known as the permeate, while the liquid that does not pass through the membrane is called the brine. The permeate is stored in a pressure tank and the brine is discharged to a waste line.

The relationship between the permeate and the brine is determined by the saturation of dissolved solids in the source water that can vary widely. In an attempt to commercially accommodate this variation, a fixed relationship is preset by a fixed orifice. This orifice typically allots five parts brine to one part permeate as a one-size-fits-all device.

The source of the feed water remains relatively constant and brine is discharged to drain through the fixed orifice at a steady rate.

As the permeate passes through the membrane and into the pressure tank it increases the pressure on the permeate side of the membrane. This in turn lowers the differential pressure which decreases the productivity of the permeate while the brine remains at its constant discharge rate.

Attention is drawn to U.S. Pat. Nos. 3,568,843, 3,616,921 and 3,939,074.

U.S. Pat. No. 5,778,679, at column 2, lines 15 to 31, states:
"In one special case involving reverse osmosis (RO) systems, the build-up of pressure in the tank reduces the efficiency of upstream water purification processes. As those skilled in the art will readily appreciation, the amount of water purified by, for example, an upstream membrane, is a strong function of the pressure drop across the membrane. A good recovery rate (for the purification process) for a residential system would be 25 percent. Since the process is slow and typical recoveries are one gallon per hour, a storage system is needed. One of the best systems available for the RO application is the diaphragm expansion tank (such as those described in the incorporated references). The drawback is that at 5 psig the recovery rate may be 25% at a supply pressure 60 psig; however, by the end of the storage cycle the tank pressure may be 40 psig with the recovery rate falling to approximately 8 percent (a poor recovery rate)."

BROAD DESCRIPTION OF THE INVENTION

An object or purpose of the invention is to reduce the amount of waste water when purifying water using reverse osmosis. Another object of the invention is to regulate the brine discharge at a rate proportional to the permeate production. Other objects and purposes of the invention will readily be thought of or ascertained from the disclosure of the invention and application by one skilled in the art.

The objects and purposes of the invention are achieved by the apparatus, device, system and process of the invention.

As pressure increases in the storage tank, the piston is forced through the O-ring that relocates it relative and proportional to the passage in the piston. With the original orifice removed from the system, this becomes a variable orifice in the invention. Waste water passes through the passage surrounded by the O-ring and is discharged by the fitting. The piston has an O-ring in an O-ring run near one end and a channel of varying width and/or depth and/or length along the surface of a portion of the other and exiting at the other end.

BRIEF DESCRIPTION OF THE DRAWINGS

In the drawings:

FIG. 3a is a cross sectional view of the preferred stem (piston) of the invention; and FIG. 3b is an end view thereof showing the open end of the preferred channel;

FIG. 4 is a graph of flows of using the preferred stem (piston) versus the flow of the known/prior stem;

DETAILED DESCRIPTON OF THE INVENTION AND DRAWINGS

Reverse osmosis (RO) is a separation process that uses pressure to force a solution through a membrane that retains the solute on one side and allows the pure solvent to pass to the other side. More formally, it is the process of forcing a solvent from a region of high solute concentration through a membrane to a region of low solute concentration by applying a pressure in excess of the osmotic pressure. Here the solvent is water.

Purification of brackish water by reverse osmosis is a recognized process. Reverse osmosis can be used effectively to treat city water to produce a purified grade of water comparable to "bottled water". A reverse osmosis system used for such purpose is often referred to as a home unit, because an individual household installation will produce purified water for drinking, cooking and other home uses where quality water is required.

The reverse osmosis unit will produce product at a relatively slow rate, therefore an amount of storage is required to maintain an appropriate amount of purified water for immediate use. Conveniently the supply of purified water is fed into a pressure storage tank that has a diaphragm that separates its interior into two compartments, one side with air and the other side with product water. As purified water is delivered into the water side of the tank, the air on the other side of the diaphragm is compressed and becomes the energy or driving force to maintain purified water in its tank compartment under pressure higher than atmospheric for delivery to the point of use. When the pressure in the tank reaches a value equal to two/thirds (for example) of the supply pressure, it closes the supply line. When product water is drawn from the tank, the tank pressure reduces and the supply line reopens.

Supply water under pressure is conducted to a module containing a semipermeable membrane. The water that passes through the membrane under supply line pressure is routed to the pressure tank. The water that does not pass through the membrane is referred to as brine. The brine is discharged to drain through a preset orifice. This discharge is at a constant rate whenever the supply valve is open. The preset orifice is part of the subject of the invention.

As product water is introduced, it gradually raises the pressure in the tank. As the pressure in the tank increases, it reduces the differential pressure across the membrane. As a result of the slowly lowering differential pressure it is accompanied by a proportional lowering rate of product water production. The purpose of the invention is to maintain the brine in the same proportion as the product water.

The increasing "back" pressure in the tank is the energy or driving force of the invention.

Figure 1:
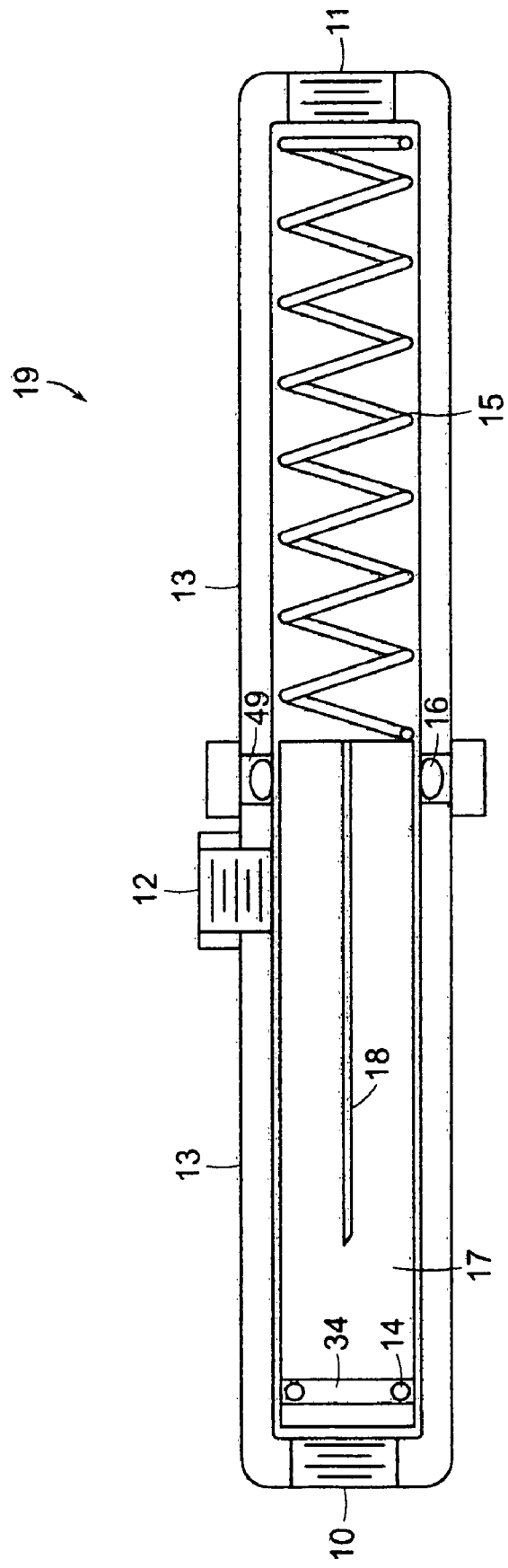
FIG. 1 is a lengthwise cross sectional view of the proportioning valve of the invention.

In FIG. 1 there is the tubular vessel 13 the fitting 10 for entrance of the permeate at one end and the fitting 11 for discharge of the brine at the opposite end. Into the side of the vessel is the third entrance fitting 12. Internal to the vessel 13, there is the piston 17 with the O-ring 14 and the passage (channel) 18 of varying width and/or depth and/or length, at the opposing ends. The return spring 15 resides at the passage 18 end of the piston 12. The second O-ring 16 is fixed in the barrel of the vessel 13. The fitting 10 is connected is connected to the back pressure from tanks that is the same pressure seen at the faucet 25 (in FIG. 2). The invention means that the existing orifice in the existing waste line 21 is removed and is not required. The side fitting 12 is connected to the waste water fitting of the membrane. The end fitting 11 is connected to the waste or drain. As pressure increases in the storage tank 30, the piston 19 is forced through the O-ring 16 that relocates it relative and proportional to the passage in the piston 19. With the original orifice removed from the system, this becomes a variable orifice in the invention. Waste water passes through the passage surrounded by the O-ring 16 and is discharged by the fitting 11. The piston 19 has an O-ring 14 in the O-ring run 32 near one end and a channel (passage) 18 of varying width and/or depth and/or length along (and in) the surface of a portion of the other end and exiting at the other end.

Figure 2:
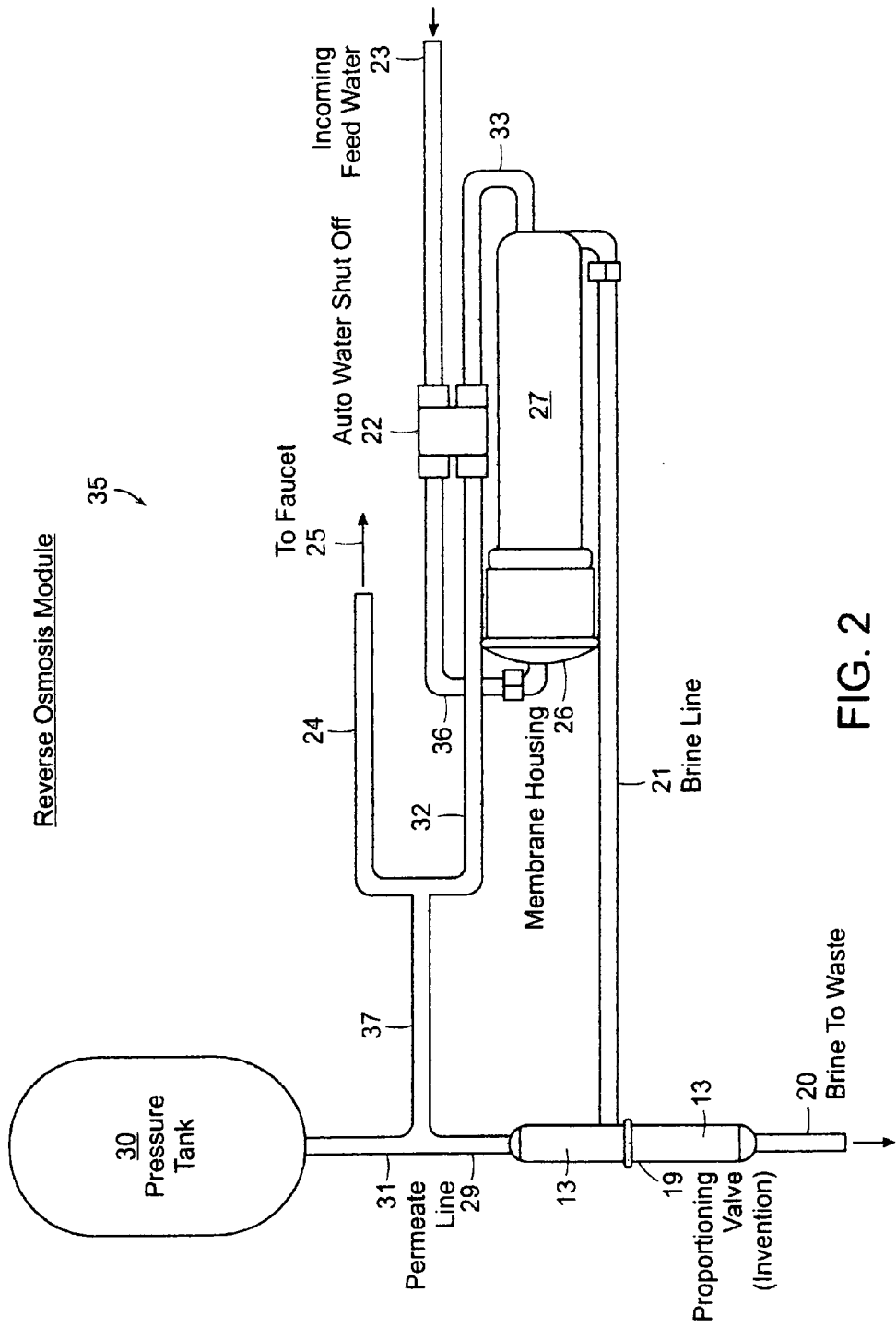
FIG. 2 is a view of the reverse osmosis module with the proportioning valve of the invention.

The reverse osmosis module 35 shown in FIG. 2 incorporates the proportioning valve 19 of the invention, that in turn incorporates the piston (stem) 17 of the invention. Incoming feed water comes in line 23 through auto (automatic) water shut off system 22 and on through line 36 into membrane housing 26 of the reverse osmosis unit 27. Brine comes out line 21 to proportioning valve 19 and then out line 20 to waste. Permeate comes out of reverse osmosis unit 27 via line 33 through auto water shut off system 22 and then on through line 32. The permeate can go out line 24 to faucet 25 (for use) or on through line 37. Line 37 branches with line 31 connected to the pressure tank 30—permeate can flow in or out of pressure tank 30 depending upon operations at that time. The other branch line 29 of line 37 conveys permeate in or out of the proportioning valve 19 at that time.

A tee is installed in the line between the pressure storage tank and the membrane module. The unused leg of the tee is connected to the top fitting of the invention. The brine line, with the usual orifice removed, is connected to the side fitting of the invention. The remaining fitting on the bottom of the invention is connected to drain.

As the pressure in the tank increases, the resulting pressure in the line depresses the stem in the valve body. This action incrementally moves the stem channel to a proportional position. As this reciprocating motion of the stem occurs, it also provides a wiping action of the stem channel. As water is drawn, the spring returns the stem to a position relative to the decreased tank pressure.

The preferred stem (piston) 17, as shown in FIG. 3a, has a vee-shaped channel 18 running about ⅓ to about ⅔ of its length. The vee-shaped channel 18 slowly decreases in depth as it moves inward on stem 17 until it ends. The channel 18 is widest and deepest at the bottom end; and as explained can vary in length and/or width and/or width. FIG. 3b shows the end of stem 17 where it is seen that the vee of channel 18 has angle of 90 degrees (that is preferred, but the vee angle can be more or less). At its widest and deepest position, with zero tank pressure, the opening afforded by channel 18 is 0.0004 square inches; at 33 psi tank pressure, the opening is 0.0001 square inches; and at 50 psi tank pressure, the opening is 0.000025 square inches. The vee-shaped channel 18 has a depth of 0.020 inch where it intersects with the end of stem 17 (see FIG. 3b) and has a depth of 0.010 inch one inch back from where it intersects with the end of stem 17.

The system as currently used is usually shut off when the tank pressure reaches two thirds of line pressure. The obvious reason for this is the diminishing returns of product water in relation to constant waste water flow. Utilizing the invention makes it possible to extend the margin to three fourths of line pressure.

Table 1, set out below, is the data of a run using the preferred stem of the invention shown in FIGS. 3a and 3b; the sampling interview was 30 seconds; and the run was conducted at 50 psi line pressure. Table 2, as set out below, is the data of a control run using the known/prior system; the sampling interview was 30 seconds; and the run was conducted at 50 psi line pressure. The results of the invention run were much better than the results of the control run.

FIG. 4 is a graph of the flow versus time for the invention proportioning valve at 50 psi and 73 psi using a 50 GPD membrane, plus for the known fixed system. Tables 1, 2 and 3 below are the raw data for the curves in such graph, respectfully, of the invention at 50 psi, the invention at 73 psi, and the known fixed system (at 50 psi).

Figure 5:
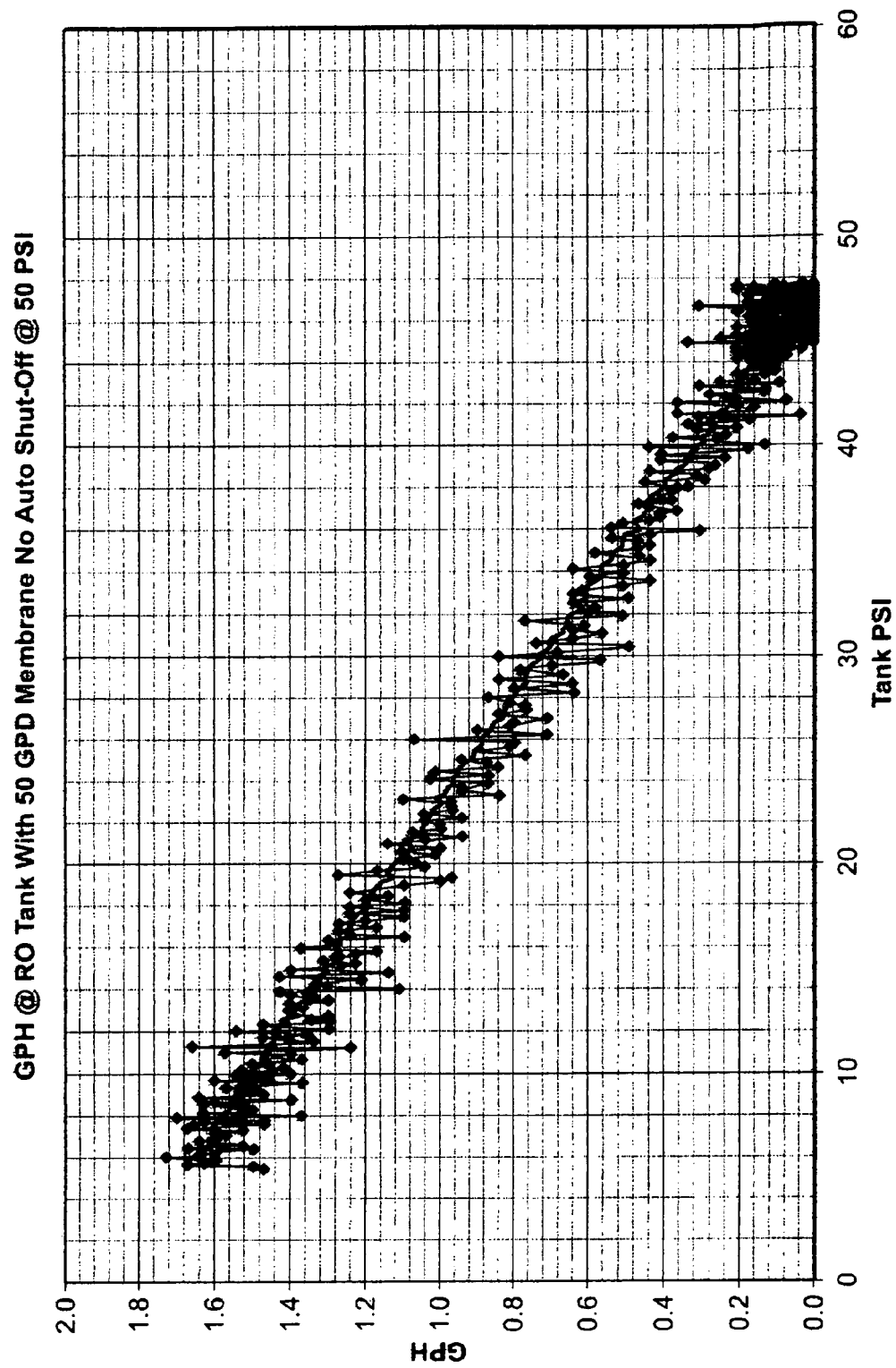
FIG. 5 is a graph that shows that the production of permeate declines proportional to the back pressure of the tank.

FIG. 5 is a graph that shows that the production of permeate declines proportional to the back pressure in the tank.

Figures 6A, 6B, 6C, 6D:
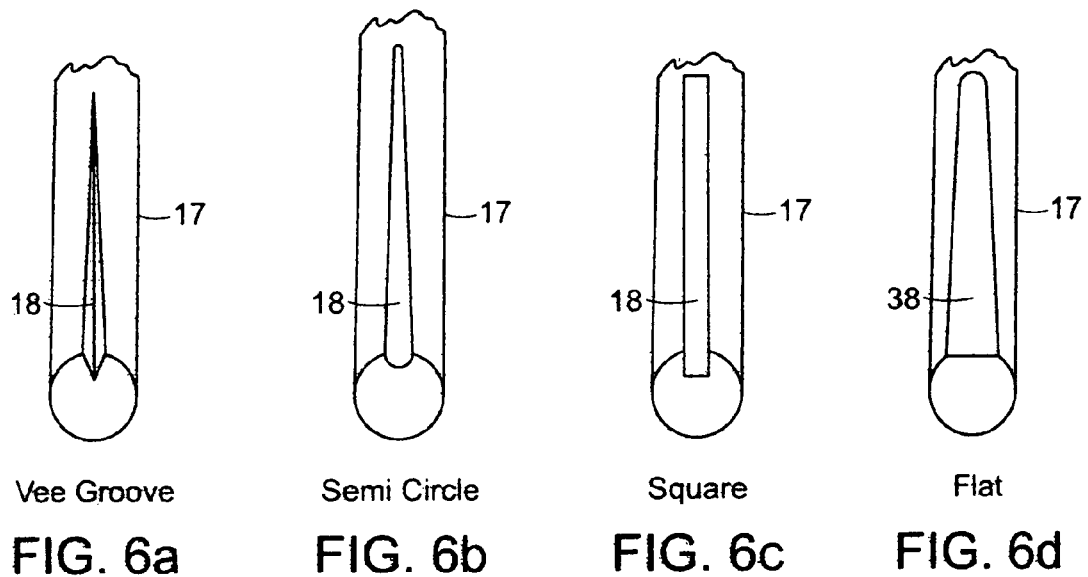
FIGS. 6a to 6d, 7a and 7b are front perspective partial views of several invention stems.
Figures 7A, 7B:
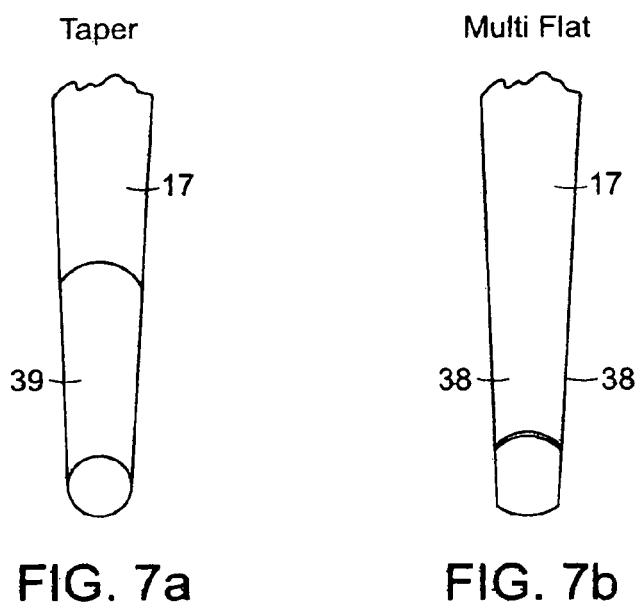

FIG. 6a shows the vee-shaped groove 18, that is preferred, in stem 17. FIG. 6b shows the semi-circle groove 18 in stem 17. FIG. 6c shows the square groove 18 in stem 17. FIG. 6d shows groove 18 being replaced with flat surface 38 that slopes inward as it approaches the end of stem 17. FIG. 7a shows stem 17 having a tapered end portion 39. The stem 17 in FIG. 7b is similar to the stem 17 in FIG. 6d except that it has two diametrically-located flat surfaces 38 that slope inward as they approach the end of stem 17.

Figure 8A:
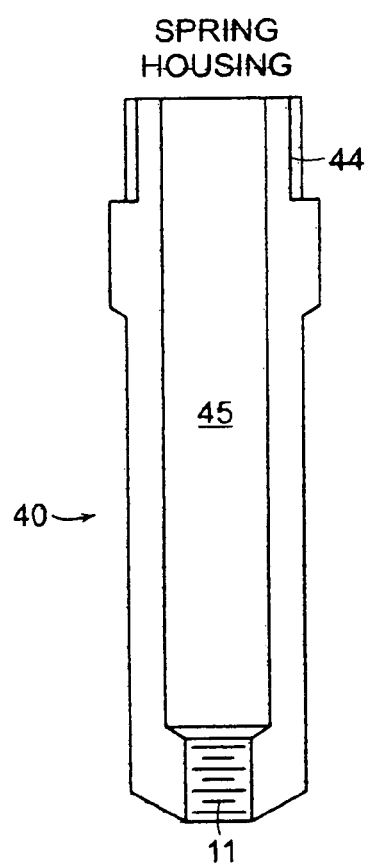
FIGS. 8a and 8b of the spring housing and the stem housing of that are screwed together to form the invention proportioning valve.
Figure 8B:
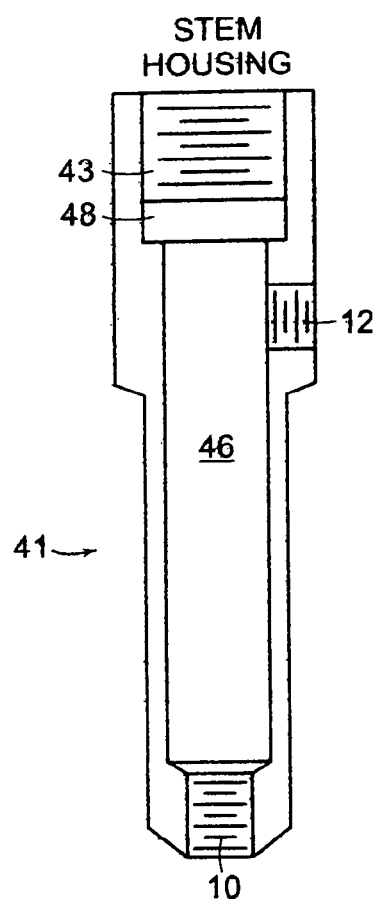
Figure 9:
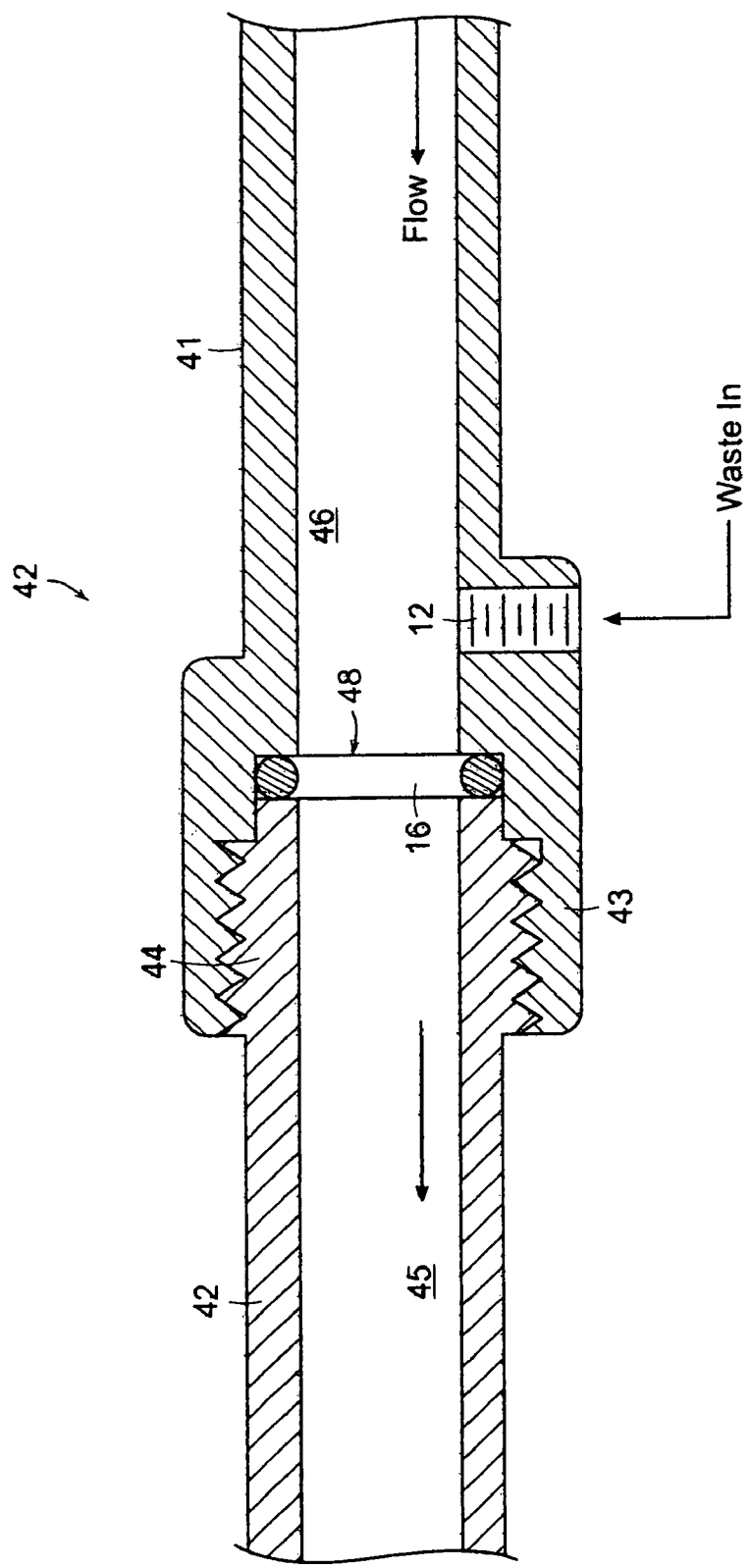
FIG. 9 is a partial view of the assembled invention proportioning valve of FIGS. 8a and 8b.

Regarding FIGS. 8a, 8b and 9, to facilitate ease of assembly, cleaning, replacement of O-rings or any other task that may be necessary during the life of the device, a threaded joint is provided between the spring housing 40 and the stem housing 41. For example, the stem housing 41 has a ¾ inch NF internal thread 43 that mates a ¾ inch NF external thread 44 on the spring housing 40. These threads are manufactured, for example, to a class 2 fit since they are not necessarily leak proof and only serve as a joining method. Invention proportioning valve 42 is formed by spring housing 40 and stem housing 41, and is therefore preferred and advantageous.

The components of invention proportioning valve 42, for example, are:

1. O-ring 14: O-ring-AS568A-109, 3/32 width, 5/16 ID, 1/2 OD-Shore:50 Durometer.
2. O-ring 16: O-ring-AS568A-206, 1/8 width, 1/2 ID, 3/4 OD-Shore:50 Durometer.
3. Stem 17: polyethylene-1/2 rod, machined per FIGS. 3a, 3b and 6a.
4. Spring 15: Spring-stainless steel, 0.484 OD, 0.386 ID, 3.38 long, 4.6 lbs/in rate.
5. Stem housing 41: upper body-polyethylene-3/4 OD, 0.500 ID, 3.437 long, machined per FIG. 8b.
6. Spring housing 40: lower body-polyethylene-3/4 OD, 1/2 ID, 3.250 long, machined per FIG. 8a.

Assembly of proportioning valve 42 is done as follows:
1. O-ring 14 is insert in o-ring run 34 in stem 17.
2. O-ring 16 is inserted into stem housing 41 in O-ring seating/run 48; and the stem 17 is inserted into stem housing 41.
3. Spring 15 is inserted into spring housing 40.
4. Stem housing 41 and spring housing 40 are threaded together, capturing O-ring 16 between them in space 48 provided for such.

TABLE 1

Sample interval 30 seconds 50 PSI
NEW VARIABLE RESRTRICTOR ASSEMBLY

| Waste Gallons | Waste ml/min | TDS | Sample # | Tank PSI | Tank LBS | P Flow Gal | % Recovery |
|---|---|---|---|---|---|---|---|
| 0 | 0 | 155 | 0 | 0.349 | 8.268 | 0.000 | |
| 0.03 | 210 | 156 | 1 | 4.246 | 8.27 | 0.000 | 0.857 |
| 0.06 | 237 | 0 | 2 | 5.311 | 8.344 | 0.009 | 22.089 |
| 0.09 | 237 | 0 | 3 | 5.43 | 8.464 | 0.014 | 31.495 |
| 0.12 | 234 | 0 | 4 | 5.546 | 8.571 | 0.013 | 29.338 |
| 0.15 | 234 | 1 | 5 | 5.659 | 8.698 | 0.015 | 33.012 |
| 0.18 | 234 | 1 | 6 | 5.747 | 8.797 | 0.012 | 27.754 |
| 0.21 | 235 | −1 | 7 | 5.851 | 8.922 | 0.015 | 32.568 |
| 0.25 | 235 | 0 | 8 | 5.944 | 9.031 | 0.013 | 29.635 |
| 0.28 | 233 | 0 | 9 | 6.033 | 9.156 | 0.015 | 32.756 |
| 0.31 | 233 | 0 | 10 | 6.127 | 9.269 | 0.014 | 30.573 |
| 0.34 | 233 | 0 | 11 | 6.218 | 9.382 | 0.014 | 30.573 |
| 0.37 | 233 | −1 | 12 | 6.317 | 9.489 | 0.013 | 29.427 |
| 0.4 | 233 | 1 | 13 | 6.414 | 9.616 | 0.015 | 33.107 |
| 0.43 | 232 | −1 | 14 | 6.516 | 9.725 | 0.013 | 29.903 |
| 0.46 | 232 | 0 | 15 | 6.616 | 9.85 | 0.015 | 32.851 |
| 0.49 | 233 | 0 | 16 | 6.718 | 9.968 | 0.014 | 31.500 |
| 0.52 | 231 | −1 | 17 | 6.82 | 10.069 | 0.012 | 28.418 |
| 0.55 | 233 | 0 | 18 | 6.929 | 10.185 | 0.014 | 31.132 |
| 0.58 | 232 | −1 | 19 | 7.037 | 10.308 | 0.015 | 32.496 |
| 0.61 | 231 | 1 | 20 | 7.146 | 10.414 | 0.013 | 29.411 |
| 0.64 | 232 | −1 | 21 | 7.257 | 10.53 | 0.014 | 31.224 |
| 0.68 | 231 | 0 | 22 | 7.366 | 10.636 | 0.013 | 29.411 |
| 0.71 | 231 | −1 | 23 | 7.475 | 10.756 | 0.014 | 32.051 |
| 0.74 | 232 | 1 | 24 | 7.58 | 10.865 | 0.013 | 29.903 |
| 0.77 | 231 | 0 | 25 | 7.69 | 10.988 | 0.015 | 32.591 |
| 0.8 | 230 | 0 | 26 | 7.798 | 11.099 | 0.013 | 30.469 |
| 0.83 | 231 | 0 | 27 | 7.902 | 11.217 | 0.014 | 31.686 |
| 0.86 | 231 | −1 | 28 | 8.013 | 11.328 | 0.013 | 30.377 |
| 0.89 | 230 | 0 | 29 | 8.123 | 11.436 | 0.013 | 29.892 |
| 0.92 | 231 | 0 | 30 | 8.24 | 11.559 | 0.015 | 32.591 |
| 0.95 | 230 | −1 | 31 | 8.351 | 11.67 | 0.013 | 30.469 |
| 0.98 | 230 | 1 | 32 | 8.466 | 11.788 | 0.014 | 31.780 |
| 1.01 | 231 | 0 | 33 | 8.583 | 11.899 | 0.013 | 30.377 |
| 1.04 | 230 | −1 | 34 | 8.696 | 12.01 | 0.013 | 30.469 |
| 1.07 | 230 | 0 | 35 | 8.813 | 12.123 | 0.014 | 30.849 |
| 1.1 | 230 | 0 | 36 | 8.926 | 12.23 | 0.013 | 29.697 |
| 1.13 | 230 | −1 | 37 | 9.047 | 12.355 | 0.015 | 33.042 |
| 1.16 | 230 | 0 | 38 | 9.166 | 12.459 | 0.012 | 29.107 |
| 1.19 | 231 | 0 | 39 | 9.289 | 12.577 | 0.014 | 31.686 |
| 1.22 | 229 | 0 | 40 | 9.402 | 12.683 | 0.013 | 29.592 |
| 1.25 | 229 | 0 | 41 | 9.527 | 12.797 | 0.014 | 31.130 |
| 1.28 | 229 | 0 | 42 | 9.64 | 12.901 | 0.012 | 29.197 |
| 1.31 | 229 | 1 | 43 | 9.751 | 13.016 | 0.014 | 31.318 |
| 1.34 | 228 | 1 | 44 | 9.87 | 13.125 | 0.013 | 30.269 |
| 1.37 | 230 | −1 | 45 | 9.998 | 13.236 | 0.013 | 30.469 |
| 1.4 | 230 | −1 | 46 | 10.135 | 13.345 | 0.013 | 30.085 |
| 1.44 | 230 | 0 | 47 | 10.268 | 13.447 | 0.012 | 28.708 |
| 1.47 | 230 | −1 | 48 | 10.407 | 13.548 | 0.012 | 28.507 |
| 1.5 | 230 | 0 | 49 | 10.538 | 13.657 | 0.013 | 30.085 |
| 1.53 | 230 | 1 | 50 | 10.669 | 13.77 | 0.014 | 30.849 |
| 1.56 | 230 | 0 | 51 | 10.808 | 13.877 | 0.013 | 29.697 |
| 1.59 | 229 | −1 | 52 | 10.939 | 13.981 | 0.012 | 29.197 |
| 1.62 | 229 | 0 | 53 | 11.075 | 14.092 | 0.013 | 30.561 |
| 1.65 | 228 | 0 | 54 | 11.21 | 14.191 | 0.012 | 28.278 |
| 1.68 | 228 | 0 | 55 | 11.352 | 14.302 | 0.013 | 30.654 |
| 1.71 | 230 | 1 | 56 | 11.49 | 14.404 | 0.012 | 28.708 |
| 1.74 | 228 | 4 | 57 | 11.631 | 14.501 | 0.012 | 27.865 |
| 1.77 | 230 | 5 | 58 | 11.771 | 14.598 | 0.012 | 27.690 |
| 1.8 | 228 | 7 | 59 | 11.909 | 14.705 | 0.013 | 29.880 |

TABLE 1-continued

Sample interval 30 seconds 50 PSI
NEW VARIABLE RESRTRICTOR ASSEMBLY

| Waste Gallons | Waste ml/min | TDS | Sample # | Tank PSI | Tank LBS | P Flow Gal | % Recovery |
|---|---|---|---|---|---|---|---|
| 1.83 | 228 | 8 | 60 | 12.057 | 14.8 | 0.011 | 27.449 |
| 1.86 | 229 | 10 | 61 | 12.202 | 14.904 | 0.012 | 29.197 |
| 1.89 | 228 | 12 | 62 | 12.353 | 14.999 | 0.011 | 27.449 |
| 1.92 | 227 | 13 | 63 | 12.496 | 15.1 | 0.012 | 28.775 |
| 1.95 | 226 | 15 | 64 | 12.648 | 15.198 | 0.012 | 28.250 |
| 1.98 | 227 | 16 | 65 | 12.79 | 15.295 | 0.012 | 27.954 |
| 2.01 | 226 | 19 | 66 | 12.931 | 15.396 | 0.012 | 28.866 |
| 2.04 | 225 | 18 | 67 | 13.084 | 15.498 | 0.012 | 29.160 |
| 2.07 | 226 | 20 | 68 | 13.231 | 15.591 | 0.011 | 27.201 |
| 2.1 | 226 | 22 | 69 | 13.385 | 15.695 | 0.012 | 29.470 |
| 2.13 | 225 | 23 | 70 | 13.532 | 15.783 | 0.011 | 26.206 |
| 2.16 | 226 | 25 | 71 | 13.689 | 15.88 | 0.012 | 28.043 |
| 2.19 | 225 | 26 | 72 | 13.84 | 15.972 | 0.011 | 27.075 |
| 2.22 | 225 | 27 | 73 | 13.998 | 16.07 | 0.012 | 28.340 |
| 2.25 | 224 | 30 | 74 | 14.152 | 16.167 | 0.012 | 28.223 |
| 2.28 | 224 | 30 | 75 | 14.304 | 16.266 | 0.012 | 28.638 |
| 2.31 | 222 | 32 | 76 | 14.463 | 16.363 | 0.012 | 28.405 |
| 2.33 | 222 | 35 | 77 | 14.617 | 16.458 | 0.011 | 27.983 |
| 2.36 | 224 | 35 | 78 | 14.778 | 16.558 | 0.012 | 28.844 |
| 2.39 | 222 | 37 | 79 | 14.935 | 16.655 | 0.012 | 28.405 |
| 2.42 | 222 | 38 | 80 | 15.1 | 16.757 | 0.012 | 29.438 |
| 2.45 | 220 | 41 | 81 | 15.257 | 16.842 | 0.010 | 25.971 |
| 2.48 | 222 | 42 | 82 | 15.419 | 16.949 | 0.013 | 30.442 |
| 2.51 | 221 | 42 | 83 | 15.587 | 17.057 | 0.013 | 30.735 |
| 2.54 | 222 | 43 | 84 | 15.748 | 17.131 | 0.009 | 23.234 |
| 2.57 | 222 | 44 | 85 | 15.916 | 17.228 | 0.012 | 28.405 |
| 2.6 | 221 | 44 | 86 | 16.084 | 17.316 | 0.011 | 26.555 |
| 2.63 | 219 | 45 | 87 | 16.255 | 17.413 | 0.012 | 28.682 |
| 2.66 | 219 | 45 | 88 | 16.42 | 17.511 | 0.012 | 28.892 |
| 2.69 | 219 | 48 | 89 | 16.596 | 17.599 | 0.011 | 26.732 |
| 2.71 | 219 | 49 | 90 | 16.765 | 17.693 | 0.011 | 28.044 |
| 2.74 | 218 | 48 | 91 | 16.935 | 17.781 | 0.011 | 26.822 |
| 2.77 | 214 | 50 | 92 | 17.112 | 17.878 | 0.012 | 29.157 |
| 2.8 | 216 | 51 | 93 | 17.285 | 17.959 | 0.010 | 25.401 |
| 2.83 | 213 | 51 | 94 | 17.456 | 18.054 | 0.011 | 28.824 |
| 2.86 | 213 | 52 | 95 | 17.637 | 18.144 | 0.011 | 27.728 |
| 2.88 | 212 | 52 | 96 | 17.822 | 18.232 | 0.011 | 27.373 |
| 2.91 | 210 | 53 | 97 | 17.995 | 18.309 | 0.009 | 24.978 |
| 2.94 | 211 | 53 | 98 | 18.182 | 18.41 | 0.012 | 30.296 |
| 2.97 | 208 | 52 | 99 | 18.361 | 18.487 | 0.009 | 25.157 |
| 2.99 | 209 | 53 | 100 | 18.54 | 18.579 | 0.011 | 28.556 |
| 3.02 | 207 | 55 | 101 | 18.731 | 18.66 | 0.010 | 26.216 |
| 3.05 | 207 | 55 | 102 | 18.912 | 18.746 | 0.010 | 27.391 |
| 3.08 | 206 | 55 | 103 | 19.104 | 18.834 | 0.011 | 27.948 |
| 3.1 | 206 | 55 | 104 | 19.296 | 18.917 | 0.010 | 26.785 |
| 3.13 | 206 | 56 | 105 | 19.49 | 18.993 | 0.009 | 25.093 |
| 3.16 | 206 | 55 | 106 | 19.682 | 19.081 | 0.011 | 27.948 |
| 3.19 | 205 | 55 | 107 | 19.87 | 19.158 | 0.009 | 25.432 |
| 3.21 | 205 | 56 | 108 | 20.066 | 19.243 | 0.010 | 27.351 |
| 3.24 | 204 | 55 | 109 | 20.261 | 19.317 | 0.009 | 24.777 |
| 3.27 | 204 | 56 | 110 | 20.458 | 19.405 | 0.011 | 28.145 |
| 3.29 | 203 | 55 | 111 | 20.643 | 19.477 | 0.009 | 24.360 |
| 3.32 | 204 | 56 | 112 | 20.838 | 19.562 | 0.010 | 27.449 |
| 3.35 | 204 | 56 | 113 | 21.027 | 19.639 | 0.009 | 25.525 |
| 3.37 | 205 | 57 | 114 | 21.225 | 19.713 | 0.009 | 24.686 |
| 3.4 | 203 | 56 | 115 | 21.411 | 19.791 | 0.009 | 25.865 |
| 3.43 | 203 | 57 | 116 | 21.608 | 19.861 | 0.008 | 23.845 |
| 3.45 | 202 | 57 | 117 | 21.808 | 19.935 | 0.009 | 24.961 |
| 3.48 | 204 | 57 | 118 | 22.004 | 20.006 | 0.009 | 24.013 |
| 3.51 | 203 | 57 | 119 | 22.207 | 20.074 | 0.008 | 23.322 |
| 3.54 | 204 | 59 | 120 | 22.401 | 20.141 | 0.008 | 22.971 |
| 3.56 | 201 | 58 | 121 | 22.602 | 20.224 | 0.010 | 27.270 |
| 3.59 | 202 | 60 | 122 | 22.797 | 20.286 | 0.007 | 21.795 |
| 3.62 | 200 | 59 | 123 | 22.994 | 20.367 | 0.010 | 26.887 |
| 3.64 | 201 | 60 | 124 | 23.201 | 20.43 | 0.008 | 22.155 |
| 3.67 | 202 | 59 | 125 | 23.389 | 20.501 | 0.009 | 24.194 |
| 3.69 | 200 | 60 | 126 | 23.599 | 20.575 | 0.009 | 25.147 |
| 3.72 | 200 | 61 | 127 | 23.802 | 20.645 | 0.008 | 24.116 |
| 3.75 | 199 | 60 | 128 | 24.009 | 20.719 | 0.009 | 25.242 |
| 3.77 | 198 | 61 | 129 | 24.209 | 20.784 | 0.008 | 22.963 |
| 3.8 | 198 | 61 | 130 | 24.418 | 20.855 | 0.009 | 24.562 |
| 3.83 | 198 | 62 | 131 | 24.607 | 20.92 | 0.008 | 22.963 |
| 3.85 | 196 | 62 | 132 | 24.8 | 20.996 | 0.009 | 26.040 |
| 3.88 | 196 | 62 | 133 | 25.019 | 21.061 | 0.008 | 23.143 |

TABLE 1-continued

Sample interval 30 seconds 50 PSI
NEW VARIABLE RESRTRICTOR ASSEMBLY

| Waste Gallons | Waste ml/min | TDS | Sample # | Tank PSI | Tank LBS | P Flow Gal | % Recovery |
|---|---|---|---|---|---|---|---|
| 3.9 | 195 | 63 | 134 | 25.225 | 21.133 | 0.009 | 25.108 |
| 3.93 | 194 | 63 | 135 | 25.444 | 21.195 | 0.007 | 22.492 |
| 3.95 | 192 | 61 | 136 | 25.652 | 21.267 | 0.009 | 25.401 |
| 3.98 | 192 | 64 | 137 | 25.871 | 21.33 | 0.008 | 22.955 |
| 4.01 | 193 | 63 | 138 | 26.077 | 21.394 | 0.008 | 23.142 |
| 4.03 | 192 | 65 | 139 | 26.289 | 21.454 | 0.007 | 22.103 |
| 4.06 | 191 | 66 | 140 | 26.501 | 21.524 | 0.008 | 24.969 |
| 4.08 | 191 | 65 | 141 | 26.708 | 21.589 | 0.008 | 23.606 |
| 4.11 | 188 | 65 | 142 | 26.932 | 21.658 | 0.008 | 24.996 |
| 4.13 | 189 | 64 | 143 | 27.15 | 21.716 | 0.007 | 21.792 |
| 4.16 | 189 | 67 | 144 | 27.381 | 21.776 | 0.007 | 22.376 |
| 4.18 | 187 | 67 | 145 | 27.606 | 21.836 | 0.007 | 22.561 |
| 4.21 | 187 | 67 | 146 | 27.843 | 21.896 | 0.007 | 22.561 |
| 4.23 | 185 | 67 | 147 | 28.072 | 21.956 | 0.007 | 22.749 |
| 4.25 | 184 | 66 | 148 | 28.302 | 22 | 0.005 | 17.840 |
| 4.28 | 182 | 67 | 149 | 28.549 | 22.081 | 0.010 | 28.781 |
| 4.3 | 182 | 68 | 150 | 28.782 | 22.13 | 0.006 | 19.644 |
| 4.33 | 180 | 69 | 151 | 29.028 | 22.19 | 0.007 | 23.234 |
| 4.35 | 180 | 71 | 152 | 29.262 | 22.243 | 0.006 | 21.096 |
| 4.37 | 177 | 69 | 153 | 29.508 | 22.31 | 0.008 | 25.579 |
| 4.39 | 159 | 70 | 154 | 29.73 | 22.352 | 0.005 | 19.345 |
| 4.42 | 162 | 71 | 155 | 29.964 | 22.398 | 0.006 | 20.498 |
| 4.44 | 161 | 71 | 156 | 30.186 | 22.451 | 0.006 | 23.012 |
| 4.46 | 160 | 72 | 157 | 30.412 | 22.498 | 0.006 | 21.056 |
| 4.48 | 160 | 71 | 158 | 30.642 | 22.546 | 0.006 | 21.408 |
| 4.5 | 159 | 72 | 159 | 30.866 | 22.59 | 0.005 | 20.081 |
| 4.52 | 159 | 73 | 160 | 31.096 | 22.646 | 0.007 | 24.231 |
| 4.54 | 159 | 75 | 161 | 31.318 | 22.685 | 0.005 | 18.215 |
| 4.56 | 160 | 76 | 162 | 31.546 | 22.729 | 0.005 | 19.981 |
| 4.58 | 159 | 78 | 163 | 31.769 | 22.771 | 0.005 | 19.345 |
| 4.61 | 160 | 78 | 164 | 31.99 | 22.817 | 0.006 | 20.701 |
| 4.63 | 159 | 78 | 165 | 32.217 | 22.858 | 0.005 | 18.972 |
| 4.65 | 159 | 81 | 166 | 32.438 | 22.898 | 0.005 | 18.595 |
| 4.67 | 159 | 81 | 167 | 32.667 | 22.939 | 0.005 | 18.972 |
| 4.69 | 157 | 80 | 168 | 32.881 | 22.981 | 0.005 | 19.543 |
| 4.71 | 156 | 80 | 169 | 33.105 | 23.027 | 0.006 | 21.120 |
| 4.73 | 157 | 83 | 170 | 33.324 | 23.062 | 0.004 | 16.834 |
| 4.75 | 156 | 83 | 171 | 33.547 | 23.113 | 0.006 | 22.890 |
| 4.75 | 2 | 84 | 172 | 33.548 | 23.122 | 0.001 | 80.338 |
| 4.75 | 0 | 83 | 173 | 33.527 | 23.124 | 0.000 | 100.000 |
| 4.75 | 0 | 84 | 174 | 33.516 | 23.131 | 0.001 | 100.000 |
| 4.75 | 0 | 81 | 175 | 33.512 | 23.136 | 0.001 | 100.000 |
| 4.75 | 0 | 77 | 176 | 33.504 | 23.129 | −0.001 | 100.000 |
| 4.75 | 0 | 76 | 177 | 33.496 | 23.138 | 0.001 | 100.000 |
| 4.75 | 0 | 76 | 178 | 33.492 | 23.143 | 0.001 | 100.000 |
| Waste Gallons | | | 4.8 | | Total Product Gallons | | 1.78 |
| Total ml's | | | 35968 | | | | |

TABLE 2

Sample interval 30 seconds 73 PSI
NEW VARIABLE RESRTRICTOR ASSEMBLY

| Waste Gall | Waste ml/mi | TDS | Sample # | Tank PSI | Tank LBS | P Flow Gal | % Recovery |
|---|---|---|---|---|---|---|---|
| 0 | 0 | 272 | 0 | 0.352 | 8.552 | 0 | |
| 0 | 0 | 272 | 1 | 0.349 | 8.55 | 0.000 | 100.000 |
| 0.03 | 233 | 357 | 2 | 5.541 | 8.638 | 0.011 | 25.536 |
| 0.06 | 231 | 156 | 3 | 5.672 | 8.832 | 0.023 | 43.264 |
| 0.09 | 231 | 75 | 4 | 5.824 | 8.998 | 0.020 | 39.486 |
| 0.12 | 228 | 48 | 5 | 5.961 | 9.153 | 0.019 | 38.168 |
| 0.15 | 229 | 38 | 6 | 6.099 | 9.329 | 0.021 | 41.102 |
| 0.18 | 227 | 36 | 7 | 6.244 | 9.484 | 0.019 | 38.272 |
| 0.21 | 227 | 37 | 8 | 6.394 | 9.644 | 0.019 | 39.024 |
| 0.24 | 228 | 35 | 9 | 6.544 | 9.85 | 0.025 | 45.067 |
| 0.27 | 227 | 35 | 10 | 6.702 | 10.03 | 0.022 | 41.860 |
| 0.3 | 224 | 36 | 11 | 6.865 | 10.192 | 0.019 | 39.638 |
| 0.33 | 223 | 35 | 12 | 7.028 | 10.363 | 0.021 | 41.047 |
| 0.36 | 226 | 35 | 13 | 7.196 | 10.544 | 0.022 | 42.103 |
| 0.39 | 224 | 35 | 14 | 7.36 | 10.715 | 0.021 | 40.939 |
| 0.42 | 225 | 35 | 15 | 7.53 | 10.881 | 0.020 | 40.116 |
| 0.45 | 226 | 36 | 16 | 7.693 | 11.064 | 0.022 | 42.371 |
| 0.48 | 223 | 35 | 17 | 7.862 | 11.242 | 0.021 | 42.021 |
| 0.51 | 224 | 34 | 18 | 8.027 | 11.416 | 0.021 | 41.360 |
| 0.54 | 223 | 36 | 19 | 8.199 | 11.587 | 0.021 | 41.047 |
| 0.57 | 226 | 35 | 20 | 8.377 | 11.756 | 0.020 | 40.440 |
| 0.6 | 223 | 35 | 21 | 8.548 | 11.925 | 0.020 | 40.763 |
| 0.63 | 223 | 35 | 22 | 8.731 | 12.098 | 0.021 | 41.329 |
| 0.66 | 224 | 35 | 23 | 8.908 | 12.262 | 0.020 | 39.932 |
| 0.69 | 223 | 35 | 24 | 9.095 | 12.438 | 0.021 | 41.746 |
| 0.72 | 223 | 35 | 25 | 9.278 | 12.607 | 0.020 | 40.763 |
| 0.75 | 221 | 36 | 26 | 9.462 | 12.78 | 0.021 | 41.547 |
| 0.78 | 224 | 36 | 27 | 9.647 | 12.942 | 0.019 | 39.638 |
| 0.8 | 222 | 35 | 28 | 9.817 | 13.118 | 0.021 | 41.856 |
| 0.83 | 221 | 36 | 29 | 10.021 | 13.287 | 0.020 | 40.980 |

TABLE 2-continued

Sample interval 30 seconds 73 PSI
NEW VARIABLE RESRTRICTOR ASSEMBLY

| Waste Gall | Waste ml/mi | TDS | Sample # | Tank PSI | Tank LBS | P Flow Gal | % Recovery |
|---|---|---|---|---|---|---|---|
| 0.86 | 220 | 35 | 30 | 10.224 | 13.444 | 0.019 | 39.320 |
| 0.89 | 220 | 35 | 31 | 10.439 | 13.615 | 0.021 | 41.375 |
| 0.92 | 223 | 36 | 32 | 10.648 | 13.782 | 0.020 | 40.476 |
| 0.95 | 221 | 37 | 33 | 10.861 | 13.953 | 0.021 | 41.265 |
| 0.98 | 220 | 36 | 34 | 11.073 | 14.071 | 0.014 | 32.751 |
| 1.01 | 219 | 37 | 35 | 11.287 | 14.275 | 0.024 | 45.823 |
| 1.04 | 220 | 36 | 36 | 11.512 | 14.437 | 0.019 | 40.070 |
| 1.07 | 220 | 37 | 37 | 11.729 | 14.552 | 0.014 | 32.187 |
| 1.1 | 220 | 35 | 38 | 11.963 | 14.758 | 0.025 | 45.952 |
| 1.12 | 220 | 35 | 39 | 12.191 | 14.922 | 0.020 | 40.365 |
| 1.15 | 219 | 36 | 40 | 12.43 | 15.08 | 0.019 | 39.580 |
| 1.18 | 216 | 36 | 41 | 12.662 | 15.235 | 0.019 | 39.452 |
| 1.21 | 217 | 37 | 42 | 12.909 | 15.403 | 0.020 | 41.279 |
| 1.24 | 218 | 36 | 43 | 13.153 | 15.547 | 0.017 | 37.491 |
| 1.27 | 218 | 37 | 44 | 13.398 | 15.713 | 0.020 | 40.878 |
| 1.3 | 218 | 37 | 45 | 13.662 | 15.866 | 0.018 | 38.923 |
| 1.33 | 216 | 37 | 46 | 13.912 | 16.023 | 0.019 | 39.758 |
| 1.35 | 216 | 36 | 47 | 14.186 | 16.183 | 0.019 | 40.213 |
| 1.38 | 213 | 36 | 48 | 14.436 | 16.333 | 0.018 | 39.003 |
| 1.41 | 214 | 36 | 49 | 14.69 | 16.477 | 0.017 | 37.926 |
| 1.44 | 213 | 37 | 50 | 14.949 | 16.641 | 0.020 | 41.146 |
| 1.47 | 212 | 37 | 51 | 15.214 | 16.794 | 0.018 | 39.588 |
| 1.49 | 212 | 37 | 52 | 15.494 | 16.944 | 0.018 | 39.115 |
| 1.52 | 212 | 36 | 53 | 15.743 | 17.087 | 0.017 | 37.983 |
| 1.55 | 212 | 36 | 54 | 15.965 | 17.252 | 0.020 | 41.407 |
| 1.58 | 212 | 37 | 55 | 16.238 | 17.409 | 0.019 | 40.207 |
| 1.61 | 210 | 37 | 56 | 16.523 | 17.557 | 0.018 | 39.022 |
| 1.63 | 210 | 37 | 57 | 16.804 | 17.707 | 0.018 | 39.341 |
| 1.66 | 209 | 36 | 58 | 17.104 | 17.858 | 0.018 | 39.614 |
| 1.69 | 211 | 37 | 59 | 17.395 | 18.003 | 0.017 | 38.423 |
| 1.72 | 209 | 36 | 60 | 17.692 | 18.144 | 0.017 | 37.987 |
| 1.74 | 206 | 37 | 61 | 18.001 | 18.295 | 0.018 | 39.961 |
| 1.77 | 207 | 37 | 62 | 18.304 | 18.447 | 0.018 | 40.003 |
| 1.8 | 206 | 38 | 63 | 18.624 | 18.595 | 0.018 | 39.480 |
| 1.83 | 205 | 37 | 64 | 18.939 | 18.732 | 0.016 | 37.765 |
| 1.85 | 202 | 37 | 65 | 19.273 | 18.887 | 0.019 | 41.063 |
| 1.88 | 202 | 37 | 66 | 19.6 | 19.021 | 0.016 | 37.591 |
| 1.91 | 198 | 37 | 67 | 19.935 | 19.162 | 0.017 | 39.269 |
| 1.93 | 196 | 37 | 68 | 20.278 | 19.313 | 0.018 | 41.160 |
| 1.96 | 194 | 38 | 69 | 20.621 | 19.437 | 0.015 | 36.724 |
| 1.98 | 193 | 39 | 70 | 20.975 | 19.583 | 0.018 | 40.719 |
| 2.01 | 189 | 39 | 71 | 21.32 | 19.715 | 0.016 | 38.806 |
| 2.03 | 190 | 38 | 72 | 21.684 | 19.856 | 0.017 | 40.257 |
| 2.06 | 190 | 39 | 73 | 22.036 | 19.995 | 0.017 | 39.914 |
| 2.08 | 189 | 39 | 74 | 22.412 | 20.138 | 0.017 | 40.723 |
| 2.11 | 189 | 36 | 75 | 22.767 | 20.268 | 0.016 | 38.445 |
| 2.13 | 187 | 39 | 76 | 23.118 | 20.363 | 0.011 | 31.567 |
| 2.16 | 186 | 39 | 77 | 23.504 | 20.481 | 0.014 | 36.550 |
| 2.18 | 186 | 39 | 78 | 23.881 | 20.656 | 0.021 | 46.071 |
| 2.21 | 184 | 40 | 79 | 24.277 | 20.784 | 0.015 | 38.712 |
| 2.23 | 185 | 40 | 80 | 24.659 | 20.915 | 0.016 | 39.134 |
| 2.25 | 183 | 40 | 81 | 25.061 | 21.047 | 0.016 | 39.575 |
| 2.28 | 182 | 39 | 82 | 25.458 | 21.172 | 0.015 | 38.409 |
| 2.3 | 181 | 41 | 83 | 25.87 | 21.297 | 0.015 | 38.540 |
| 2.33 | 179 | 40 | 84 | 26.286 | 21.422 | 0.015 | 38.803 |
| 2.35 | 181 | 42 | 85 | 26.716 | 21.547 | 0.015 | 38.540 |
| 2.37 | 178 | 40 | 86 | 27.172 | 21.667 | 0.014 | 37.970 |
| 2.4 | 177 | 42 | 87 | 27.629 | 21.783 | 0.014 | 37.307 |
| 2.42 | 176 | 40 | 88 | 28.123 | 21.91 | 0.015 | 39.585 |
| 2.44 | 174 | 41 | 89 | 28.609 | 22.026 | 0.014 | 37.708 |
| 2.47 | 171 | 41 | 90 | 29.117 | 22.144 | 0.014 | 38.521 |
| 2.49 | 172 | 42 | 91 | 29.634 | 22.257 | 0.014 | 37.364 |
| 2.51 | 170 | 41 | 92 | 30.146 | 22.368 | 0.013 | 37.220 |
| 2.53 | 167 | 42 | 93 | 30.682 | 22.481 | 0.014 | 38.057 |
| 2.55 | 157 | 42 | 94 | 31.187 | 22.595 | 0.014 | 39.734 |
| 2.57 | 142 | 42 | 95 | 31.73 | 22.706 | 0.013 | 41.513 |
| 2.59 | 145 | 44 | 96 | 32.257 | 22.808 | 0.012 | 38.977 |
| 2.61 | 146 | 44 | 97 | 32.809 | 22.912 | 0.012 | 39.276 |
| 2.63 | 143 | 45 | 98 | 33.346 | 23.023 | 0.013 | 41.342 |
| 2.65 | 144 | 45 | 99 | 33.895 | 23.062 | 0.005 | 19.738 |
| 2.67 | 144 | 45 | 100 | 34.422 | 23.217 | 0.019 | 49.428 |
| 2.69 | 140 | 45 | 101 | 34.942 | 23.319 | 0.012 | 39.815 |
| 2.71 | 141 | 46 | 102 | 35.486 | 23.414 | 0.011 | 37.957 |
| 2.72 | 140 | 47 | 103 | 36 | 23.52 | 0.013 | 40.740 |
| 2.74 | 141 | 46 | 104 | 36.533 | 23.61 | 0.011 | 38.692 |
| 2.76 | 140 | 46 | 105 | 37.042 | 23.7 | 0.011 | 36.857 |
| 2.78 | 140 | 47 | 106 | 37.572 | 23.798 | 0.012 | 38.860 |
| 2.8 | 139 | 48 | 107 | 38.077 | 23.879 | 0.010 | 34.603 |
| 2.82 | 137 | 48 | 108 | 38.579 | 23.964 | 0.010 | 36.035 |
| 2.83 | 138 | 48 | 109 | 39.1 | 24.061 | 0.012 | 38.959 |
| 2.85 | 138 | 48 | 110 | 39.599 | 24.152 | 0.011 | 37.451 |
| 2.87 | 138 | 50 | 111 | 40.117 | 24.228 | 0.009 | 33.336 |
| 2.89 | 136 | 50 | 112 | 40.613 | 24.3 | 0.009 | 32.465 |
| 2.91 | 137 | 50 | 113 | 41.13 | 24.392 | 0.011 | 37.879 |
| 2.92 | 134 | 51 | 114 | 41.621 | 24.471 | 0.009 | 34.867 |
| 2.94 | 134 | 51 | 115 | 42.131 | 24.524 | 0.006 | 26.424 |
| 2.96 | 134 | 50 | 116 | 42.619 | 24.633 | 0.013 | 42.482 |
| 2.98 | 130 | 51 | 117 | 43.107 | 24.711 | 0.009 | 35.267 |
| 2.99 | 132 | 52 | 118 | 43.609 | 24.785 | 0.009 | 33.732 |
| 3.01 | 132 | 52 | 119 | 44.094 | 24.866 | 0.010 | 35.781 |
| 3.03 | 117 | 53 | 120 | 44.58 | 24.94 | 0.009 | 36.479 |
| 3.04 | 109 | 52 | 121 | 45.068 | 25.005 | 0.008 | 35.127 |
| 3.06 | 101 | 54 | 122 | 45.57 | 25.077 | 0.009 | 39.294 |
| 3.07 | 101 | 64 | 123 | 46.047 | 25.16 | 0.010 | 42.732 |
| 3.08 | 101 | 56 | 124 | 46.545 | 25.218 | 0.007 | 34.272 |
| 3.1 | 105 | 55 | 125 | 47.026 | 25.29 | 0.009 | 38.372 |
| 3.11 | 104 | 57 | 126 | 47.5 | 25.352 | 0.007 | 35.120 |
| 3.12 | 100 | 57 | 127 | 47.988 | 25.414 | 0.007 | 36.019 |
| 3.14 | 102 | 59 | 128 | 48.45 | 25.479 | 0.008 | 36.654 |
| 3.15 | 86 | 58 | 129 | 48.731 | 25.528 | 0.006 | 34.096 |

Waste Gallons 3.1 Total Product 2.036
Total ml's 23825 Gallons

TABLE 3

Sample interval 30 seconds 50 PSI
CONTROL SAMPLE USING FLOW RESTRICTOR & 50 GPD MEMBRANE

| Waste Gallons | Waste ml/min | TDS | Sample # | Tank PSI | Tank lbs | P Flow Gal | % Recovery |
|---|---|---|---|---|---|---|---|
| 0 | 0 | 58 | 0 | 5.793 | 8.197 | 0 | 0 |
| 0.04 | 275 | 72 | 1 | 5.945 | 8.271 | 0.009 | 19.636 |
| 0.07 | 275 | 82 | 2 | 6.081 | 8.395 | 0.015 | 29.049 |
| 0.11 | 275 | 283 | 3 | 6.198 | 8.505 | 0.013 | 26.643 |
| 0.15 | 275 | 222 | 4 | 6.305 | 8.611 | 0.013 | 25.926 |
| 0.18 | 274 | 141 | 5 | 6.409 | 8.733 | 0.015 | 28.790 |
| 0.22 | 274 | 92 | 6 | 6.511 | 8.844 | 0.013 | 26.892 |
| 0.25 | 274 | 70 | 7 | 6.613 | 8.957 | 0.014 | 27.245 |
| 0.29 | 275 | 59 | 8 | 6.719 | 9.076 | 0.014 | 28.208 |
| 0.33 | 275 | 54 | 9 | 6.817 | 9.194 | 0.014 | 28.038 |
| 0.36 | 273 | 53 | 10 | 6.921 | 9.304 | 0.013 | 26.786 |
| 0.4 | 274 | 51 | 11 | 7.021 | 9.415 | 0.013 | 26.892 |
| 0.43 | 274 | 50 | 12 | 7.122 | 9.537 | 0.015 | 28.790 |
| 0.47 | 274 | 50 | 13 | 7.23 | 9.64 | 0.012 | 25.447 |
| 0.51 | 274 | 51 | 14 | 7.336 | 9.748 | 0.013 | 26.357 |
| 0.54 | 275 | 50 | 15 | 7.45 | 9.859 | 0.013 | 26.820 |
| 0.58 | 274 | 51 | 16 | 7.558 | 9.983 | 0.015 | 29.124 |
| 0.62 | 275 | 50 | 17 | 7.669 | 10.089 | 0.013 | 25.926 |
| 0.65 | 274 | 51 | 18 | 7.773 | 10.199 | 0.012 | 26.714 |
| 0.69 | 275 | 51 | 19 | 7.882 | 10.303 | 0.012 | 25.561 |
| 0.73 | 275 | 51 | 20 | 7.99 | 10.42 | 0.014 | 27.866 |
| 0.76 | 274 | 51 | 21 | 8.097 | 10.533 | 0.014 | 27.245 |
| 0.8 | 275 | 50 | 22 | 8.21 | 10.639 | 0.013 | 25.926 |
| 0.83 | 274 | 51 | 23 | 8.318 | 10.747 | 0.013 | 26.357 |
| 0.87 | 275 | 50 | 24 | 8.429 | 10.853 | 0.013 | 25.926 |
| 0.91 | 275 | 50 | 25 | 8.536 | 10.968 | 0.014 | 27.521 |
| 0.94 | 273 | 50 | 26 | 8.651 | 11.067 | 0.012 | 24.771 |
| 0.98 | 275 | 50 | 27 | 8.755 | 11.182 | 0.014 | 27.521 |
| 1.02 | 275 | 51 | 28 | 8.865 | 11.288 | 0.013 | 25.926 |
| 1.05 | 274 | 51 | 29 | 8.978 | 11.392 | 0.012 | 25.631 |
| 1.09 | 276 | 50 | 30 | 9.089 | 11.5 | 0.013 | 26.216 |

TABLE 3-continued

Sample interval 30 seconds 50 PSI
CONTROL SAMPLE USING FLOW
RESTRICTOR & 50 GPD MEMBRANE

| Waste Gallons | Waste ml/min | TDS | Sample # | Tank PSI | Tank lbs | P Flow Gal | % Recovery |
|---|---|---|---|---|---|---|---|
| 1.12 | 272 | 51 | 31 | 9.202 | 11.606 | 0.013 | 26.137 |
| 1.16 | 275 | 51 | 32 | 9.315 | 11.711 | 0.013 | 25.744 |
| 1.2 | 274 | 52 | 33 | 9.43 | 11.824 | 0.014 | 27.245 |
| 1.23 | 275 | 52 | 34 | 9.544 | 11.928 | 0.012 | 25.561 |
| 1.27 | 275 | 52 | 35 | 9.664 | 12.034 | 0.013 | 25.926 |
| 1.3 | 274 | 51 | 36 | 9.774 | 12.135 | 0.012 | 25.077 |
| 1.34 | 275 | 50 | 37 | 9.879 | 12.243 | 0.013 | 26.286 |
| 1.38 | 274 | 52 | 38 | 10 | 12.342 | 0.012 | 24.703 |
| 1.41 | 275 | 51 | 39 | 10.116 | 12.446 | 0.012 | 25.561 |
| 1.45 | 276 | 52 | 40 | 10.235 | 12.556 | 0.013 | 26.572 |
| 1.49 | 274 | 51 | 41 | 10.344 | 12.651 | 0.011 | 23.944 |
| 1.52 | 273 | 52 | 42 | 10.474 | 12.752 | 0.012 | 25.146 |
| 1.56 | 274 | 52 | 43 | 10.601 | 12.86 | 0.013 | 26.357 |
| 1.59 | 274 | 53 | 44 | 10.731 | 12.964 | 0.012 | 25.631 |
| 1.63 | 274 | 52 | 45 | 10.863 | 13.065 | 0.012 | 25.077 |
| 1.67 | 274 | 52 | 46 | 10.989 | 13.166 | 0.012 | 25.077 |
| 1.7 | 275 | 51 | 47 | 11.122 | 13.263 | 0.012 | 24.258 |
| 1.74 | 275 | 53 | 48 | 11.254 | 13.373 | 0.013 | 26.643 |
| 1.67 | 274 | 52 | 46 | 10.989 | 13.166 | 0.012 | 25.077 |
| 1.7 | 275 | 51 | 47 | 11.122 | 13.263 | 0.012 | 24.258 |
| 1.74 | 275 | 53 | 48 | 11.254 | 13.373 | 0.013 | 26.643 |
| 1.78 | 273 | 52 | 49 | 11.386 | 13.472 | 0.012 | 24.771 |
| 1.81 | 275 | 53 | 50 | 11.515 | 13.573 | 0.012 | 25.008 |
| 1.85 | 275 | 52 | 51 | 11.648 | 13.675 | 0.012 | 25.194 |
| 1.88 | 275 | 53 | 52 | 11.776 | 13.769 | 0.011 | 23.686 |
| 1.92 | 275 | 52 | 53 | 11.907 | 13.87 | 0.012 | 25.008 |
| 1.96 | 275 | 52 | 54 | 12.047 | 13.967 | 0.012 | 24.258 |
| 1.99 | 274 | 52 | 55 | 12.18 | 14.068 | 0.012 | 25.077 |
| 2.03 | 274 | 52 | 56 | 12.32 | 14.167 | 0.012 | 24.703 |
| 2.07 | 275 | 52 | 57 | 12.456 | 14.259 | 0.011 | 23.299 |
| 2.1 | 275 | 53 | 58 | 12.592 | 14.356 | 0.012 | 24.258 |
| 2.14 | 274 | 53 | 59 | 12.729 | 14.453 | 0.012 | 24.325 |
| 2.17 | 275 | 53 | 60 | 12.869 | 14.554 | 0.012 | 25.008 |
| 2.21 | 274 | 52 | 61 | 13.01 | 14.648 | 0.011 | 23.752 |
| 2.25 | 275 | 53 | 62 | 13.147 | 14.736 | 0.011 | 22.514 |
| 2.28 | 274 | 53 | 63 | 13.293 | 14.832 | 0.012 | 24.135 |
| 2.32 | 275 | 54 | 64 | 13.43 | 14.929 | 0.012 | 24.258 |
| 2.36 | 275 | 54 | 65 | 13.574 | 15.026 | 0.012 | 24.258 |
| 2.39 | 274 | 53 | 66 | 13.716 | 15.118 | 0.011 | 23.364 |
| 2.43 | 274 | 54 | 67 | 13.862 | 15.217 | 0.012 | 24.703 |
| 2.47 | 275 | 54 | 68 | 14.004 | 15.309 | 0.011 | 23.299 |
| 2.5 | 275 | 55 | 69 | 14.146 | 15.399 | 0.011 | 22.909 |
| 2.54 | 274 | 54 | 70 | 14.291 | 15.486 | 0.010 | 22.379 |
| 2.57 | 276 | 55 | 71 | 14.437 | 15.585 | 0.012 | 24.568 |
| 2.61 | 274 | 55 | 72 | 14.591 | 15.666 | 0.010 | 21.162 |
| 2.65 | 274 | 55 | 73 | 14.734 | 15.762 | 0.012 | 24.135 |
| 2.68 | 275 | 56 | 74 | 14.884 | 15.857 | 0.011 | 23.878 |
| 2.72 | 274 | 55 | 75 | 15.031 | 15.942 | 0.010 | 21.977 |
| 2.76 | 275 | 56 | 76 | 15.179 | 16.038 | 0.012 | 24.068 |
| 2.79 | 275 | 55 | 77 | 15.337 | 16.124 | 0.010 | 22.116 |
| 2.83 | 276 | 56 | 78 | 15.483 | 16.213 | 0.011 | 22.648 |
| 2.86 | 275 | 55 | 79 | 15.639 | 16.301 | 0.011 | 22.514 |
| 2.9 | 275 | 56 | 80 | 15.792 | 16.379 | 0.009 | 20.480 |
| 2.94 | 275 | 56 | 81 | 15.936 | 16.469 | 0.011 | 22.909 |
| 2.97 | 275 | 55 | 82 | 16.099 | 16.563 | 0.011 | 23.686 |
| 3.01 | 275 | 56 | 83 | 16.259 | 16.648 | 0.010 | 21.915 |
| 3.05 | 274 | 56 | 84 | 16.411 | 16.736 | 0.011 | 22.578 |
| 3.08 | 274 | 55 | 85 | 16.567 | 16.816 | 0.010 | 20.955 |
| 3.12 | 274 | 56 | 86 | 16.725 | 16.904 | 0.011 | 22.578 |
| 3.15 | 275 | 56 | 87 | 16.878 | 16.984 | 0.010 | 20.895 |
| 3.19 | 275 | 57 | 88 | 17.044 | 17.074 | 0.011 | 22.909 |
| 3.23 | 275 | 56 | 89 | 17.2 | 17.159 | 0.010 | 21.915 |
| 3.26 | 275 | 56 | 90 | 17.361 | 17.226 | 0.008 | 18.115 |
| 3.3 | 275 | 57 | 91 | 17.52 | 17.314 | 0.011 | 22.514 |
| 3.34 | 275 | 58 | 92 | 17.68 | 17.401 | 0.010 | 22.316 |
| 3.37 | 274 | 57 | 93 | 17.849 | 17.479 | 0.009 | 20.539 |
| 3.41 | 273 | 57 | 94 | 18.006 | 17.569 | 0.011 | 23.038 |
| 3.44 | 275 | 57 | 95 | 18.174 | 17.645 | 0.009 | 20.060 |
| 3.48 | 275 | 57 | 96 | 18.336 | 17.721 | 0.009 | 20.060 |
| 3.52 | 275 | 57 | 97 | 18.505 | 17.808 | 0.010 | 22.316 |
| 3.55 | 274 | 58 | 98 | 18.671 | 17.891 | 0.010 | 21.572 |
| 3.59 | 275 | 57 | 99 | 18.844 | 17.969 | 0.009 | 20.480 |
| 3.63 | 275 | 58 | 100 | 19.009 | 18.052 | 0.010 | 21.510 |
| 3.66 | 273 | 58 | 101 | 19.171 | 18.055 | 0.000 | 0.988 |
| 3.7 | 274 | 58 | 102 | 19.344 | 18.197 | 0.017 | 31.999 |
| 3.73 | 273 | 59 | 103 | 19.513 | 18.273 | 0.009 | 20.177 |
| 3.77 | 275 | 59 | 104 | 19.693 | 18.345 | 0.009 | 19.207 |
| 3.81 | 275 | 59 | 105 | 19.86 | 18.428 | 0.010 | 21.510 |
| 3.84 | 274 | 60 | 106 | 20.04 | 18.51 | 0.010 | 21.367 |
| 3.88 | 274 | 60 | 107 | 20.216 | 18.577 | 0.008 | 18.169 |
| 3.92 | 275 | 59 | 108 | 20.388 | 18.653 | 0.009 | 20.060 |
| 3.95 | 275 | 59 | 109 | 20.568 | 18.727 | 0.009 | 19.636 |
| 3.99 | 275 | 59 | 110 | 20.739 | 18.793 | 0.008 | 17.893 |
| 4.02 | 275 | 60 | 111 | 20.917 | 18.865 | 0.009 | 19.207 |
| 4.06 | 274 | 60 | 112 | 21.092 | 18.948 | 0.010 | 21.572 |
| 4.1 | 276 | 60 | 113 | 21.274 | 19.017 | 0.008 | 18.500 |
| 4.13 | 275 | 60 | 114 | 21.443 | 19.072 | 0.007 | 15.369 |
| 4.17 | 275 | 60 | 115 | 21.629 | 19.153 | 0.010 | 21.101 |
| 4.21 | 274 | 62 | 116 | 21.805 | 19.231 | 0.009 | 20.539 |
| 4.24 | 274 | 61 | 117 | 21.98 | 19.295 | 0.008 | 17.498 |
| 4.28 | 275 | 61 | 118 | 22.164 | 19.364 | 0.008 | 18.555 |
| 4.32 | 275 | 62 | 119 | 22.338 | 19.429 | 0.008 | 17.670 |
| 4.35 | 274 | 62 | 120 | 22.523 | 19.507 | 0.009 | 20.539 |
| 4.39 | 275 | 63 | 121 | 22.7 | 19.567 | 0.007 | 16.535 |
| 4.42 | 273 | 62 | 122 | 22.887 | 19.64 | 0.009 | 19.536 |
| 4.46 | 276 | 62 | 123 | 23.061 | 19.705 | 0.008 | 17.617 |
| 4.5 | 276 | 62 | 124 | 23.238 | 19.769 | 0.008 | 17.393 |
| 4.53 | 274 | 64 | 125 | 23.42 | 19.831 | 0.007 | 17.044 |
| 4.57 | 275 | 64 | 126 | 23.587 | 19.894 | 0.008 | 17.220 |
| 4.61 | 275 | 64 | 127 | 23.77 | 19.96 | 0.008 | 17.893 |
| 4.64 | 275 | 65 | 128 | 23.95 | 20.025 | 0.008 | 17.670 |
| 4.68 | 274 | 65 | 129 | 24.14 | 20.082 | 0.007 | 15.888 |
| 4.71 | 274 | 66 | 130 | 24.308 | 20.149 | 0.008 | 18.169 |
| 4.75 | 275 | 66 | 131 | 24.51 | 20.22 | 0.009 | 18.991 |
| 4.79 | 274 | 65 | 132 | 24.689 | 20.269 | 0.006 | 13.970 |
| 4.82 | 275 | 67 | 133 | 24.851 | 20.338 | 0.008 | 18.555 |
| 4.86 | 273 | 66 | 134 | 25.037 | 20.398 | 0.007 | 16.636 |
| 4.9 | 275 | 67 | 135 | 25.223 | 20.457 | 0.007 | 16.305 |
| 4.93 | 275 | 66 | 136 | 25.414 | 20.513 | 0.007 | 15.605 |
| 4.97 | 274 | 67 | 137 | 25.597 | 20.57 | 0.007 | 15.888 |
| 5 | 275 | 66 | 138 | 25.789 | 20.623 | 0.006 | 14.893 |
| 5.04 | 275 | 67 | 139 | 25.967 | 20.695 | 0.009 | 19.207 |
| 5.08 | 273 | 69 | 140 | 26.159 | 20.747 | 0.006 | 14.745 |
| 5.11 | 275 | 69 | 141 | 26.336 | 20.81 | 0.008 | 17.220 |
| 5.15 | 274 | 69 | 142 | 26.519 | 20.865 | 0.007 | 15.416 |
| 5.19 | 275 | 68 | 143 | 26.711 | 20.922 | 0.007 | 15.839 |
| 5.22 | 274 | 70 | 144 | 26.894 | 20.964 | 0.005 | 12.218 |
| 5.26 | 274 | 70 | 145 | 27.051 | 21.1 | 0.016 | 31.067 |
| 5.29 | 274 | 70 | 146 | 27.257 | 21.021 | 0.009 | 19.913 |
| 5.33 | 274 | 69 | 147 | 27.456 | 21.13 | 0.013 | 26.536 |
| 5.37 | 276 | 71 | 148 | 27.645 | 21.185 | 0.007 | 15.322 |
| 5.4 | 275 | 71 | 149 | 27.838 | 21.245 | 0.007 | 16.535 |
| 5.44 | 274 | 72 | 150 | 28.035 | 21.293 | 0.006 | 13.724 |
| 5.48 | 274 | 72 | 151 | 28.23 | 21.344 | 0.006 | 14.457 |
| 5.51 | 274 | 71 | 152 | 28.437 | 21.392 | 0.006 | 13.724 |
| 5.55 | 275 | 73 | 153 | 28.634 | 21.438 | 0.006 | 13.186 |
| 5.58 | 274 | 72 | 154 | 28.838 | 21.489 | 0.006 | 14.457 |
| 5.62 | 274 | 72 | 155 | 29.035 | 21.535 | 0.006 | 13.227 |
| 5.66 | 275 | 73 | 156 | 29.241 | 21.583 | 0.006 | 13.681 |
| 5.69 | 275 | 74 | 157 | 29.441 | 21.638 | 0.007 | 15.369 |
| 5.73 | 275 | 74 | 158 | 29.639 | 21.677 | 0.005 | 11.408 |
| 5.77 | 275 | 74 | 159 | 29.845 | 21.723 | 0.006 | 13.186 |
| 5.8 | 276 | 75 | 160 | 30.044 | 21.774 | 0.006 | 14.368 |
| 5.84 | 275 | 76 | 161 | 30.251 | 21.818 | 0.005 | 12.685 |
| 5.87 | 275 | 76 | 162 | 30.446 | 21.861 | 0.005 | 12.433 |
| 5.91 | 274 | 77 | 163 | 30.651 | 21.905 | 0.005 | 12.726 |
| 5.95 | 275 | 78 | 164 | 30.847 | 21.942 | 0.004 | 10.887 |
| 5.98 | 274 | 79 | 165 | 31.042 | 21.993 | 0.006 | 14.457 |
| 6.02 | 275 | 78 | 166 | 31.241 | 22.029 | 0.004 | 10.624 |
| 6.06 | 275 | 78 | 167 | 31.436 | 22.08 | 0.006 | 14.412 |
| 6.09 | 274 | 80 | 168 | 31.635 | 22.119 | 0.005 | 11.445 |
| 6.13 | 275 | 80 | 169 | 31.828 | 22.154 | 0.004 | 10.359 |
| 6.17 | 276 | 81 | 170 | 32.025 | 22.204 | 0.006 | 14.126 |
| 6.2 | 275 | 81 | 171 | 32.22 | 22.241 | 0.004 | 10.887 |
| 6.24 | 276 | 81 | 172 | 32.417 | 22.278 | 0.004 | 10.852 |
| 6.27 | 275 | 82 | 173 | 32.607 | 22.315 | 0.004 | 10.887 |

TABLE 3-continued

Sample interval 30 seconds 50 PSI
CONTROL SAMPLE USING FLOW
RESTRICTOR & 50 GPD MEMBRANE

| Waste Gallons | Waste ml/min | TDS | Sample # | Tank PSI | Tank lbs | P Flow Gal | % Recovery |
|---|---|---|---|---|---|---|---|
| 6.31 | 276 | 83 | 174 | 32.798 | 22.354 | 0.005 | 11.371 |
| 6.35 | 274 | 84 | 175 | 32.992 | 22.395 | 0.005 | 11.962 |
| 6.38 | 275 | 84 | 176 | 33.172 | 22.43 | 0.004 | 10.359 |
| Waste Gallons | | | 6.4 | Total Product Gallons | | 1.73 | |
| Total ml's | | 48333 | | | | | |

What is claimed is:

1. A reverse osmosis module comprising: a reverse osmosis membrane generating a permeate and retentate or waste flow; and a proportioning valve to regulate the flow of waste, the valve comprising an elongated cylindrical piston, having an O-ring seal near one axial end of the piston, and having a groove or channel extending axially along the length of the piston from the other end of the piston and extending inwardly of the piston a distance of about one half to two thirds of the distance from the other end of the piston.

2. The reverse osmosis module of claim 1, wherein the piston groove is vee shaped.

3. The reverse osmosis module of claim 1, the valve comprising a casing that has a central passageway, an opening at each end of the central passageway, the elongated cylindrical piston located in the central passageway, an o-ring run located at the one end of elongated cylindrical piston, a spring located in the central passageway, one end of the spring located at one of the openings of the central passageway, the other end of the spring located against the elongated cylindrical piston away from the other opening of the central passageway, whereby the spring normally holds the one end of the elongated cylindrical piston against the other opening of the central passageway, an O-ring in an O-ring run in the wall of the central passageway located over the other end of the elongated piston when it is in the normal position, and an opening in the wall of the central passageway between the O-ring run in the wall of the central passageway and the other opening of the central passageway.

4. The reverse osmosis module of claim 1, wherein the proportioning valve is arranged for utilizing the varying accumulated pressure in the storage tank of a residential reverse osmosis drinking water system to proportion the waste water to the product water.

5. A reverse osmosis module of claim 1, wherein the proportioning valve is configured to be added to a residential reverse osmosis drinking water system that utilizes varying accumulated pressure in a storage tank as the energy to modulate the waste water flow in proportion to the product water flow.

* * * * *